United States Patent [19]

Iversen

[11] 4,039,773

[45] Aug. 2, 1977

[54] ELECTRONIC CHARGING CONTROL DEVICE FOR ELECTRIC STORAGE HEATERS

[75] Inventor: Poul Christian Carlos Iversen, Nordborg, Denmark

[73] Assignee: Danfoss A/S, Nordborg, Denmark

[21] Appl. No.: 619,617

[22] Filed: Oct. 6, 1975

[30] Foreign Application Priority Data

Oct. 25, 1974 Germany .............................. 2450688

[51] Int. Cl.² ............................................. H05B 1/02
[52] U.S. Cl. .................................. 219/364; 219/365; 219/378; 126/400; 165/118; 219/497
[58] Field of Search ............... 219/364, 378, 365, 341, 219/325, 326, 530, 540, 493, 497; 165/18; 126/400

[56] References Cited

U.S. PATENT DOCUMENTS 3,975,620 8/1976 Hallgreen .............................. 219/378

FOREIGN PATENT DOCUMENTS

| 2,348,741 | 10/1975 | Germany | 219/364 |
|---|---|---|---|
| 2,044,934 | 3/1972 | Germany | 219/364 |
| 2,428,095 | 1/1976 | Germany | 219/364 |
| 1,765,961 | 12/1973 | Germany | 219/364 |
| 2,236,866 | 2/1974 | Germany | 219/364 |

*Primary Examiner*—J. V. Truhe
*Assistant Examiner*—M. Paschall

[57] ABSTRACT

The invention relates to a control unit for electric storage heaters which are supplied with energy during low tariff periods and which give up stored energy during high tariff periods. An electronic integrator which is judiciously charged and discharged is used as a control indicator. The integrator is (1) charged to a fixed predetermined value during the high tariff period and (2) discharged starting at the beginning of the low tariff period at a rate inversely proportional to the outdoor temperature. The discharged state of the integrator is sensed and at that time, and for the remainder of the low tariff period, a signal is developed which can be used to actuate a relay to direct electrical energy to storage heaters. If the integrator does not fully discharge during the low tariff period the remaining charge is sensed and a synchronizing circuit is actuated to rapidly remove the charge prior to the start of the high tariff period.

5 Claims, 3 Drawing Figures

ELECTRONIC CHARGING CONTROL DEVICE FOR ELECTRIC STORAGE HEATERS

The invention relates to an electronic charging control device for electric storage heaters that are heated during a low tariff period and discharge stored heat during the high tariff period, comprising an electronic integrator which is charged or discharged by a current from commencement of the low tariff period and later, for example during the high tariff period, discharged or charged by a current, respectively, the charging current and/or the discharging current being governed by at least one parameter such as the outside temperature, and comprising a sensing circuit which ascertains the charge condition.

The heating of electric storage heaters during the low tariff period must be controlled in dependence on the anticipated heat requirement during the next high tariff period. This can be done, for example, in dependence on the outside temperature, in dependence on the set switch number of the fan of the storage heater during the preceding high tariff period, or in some other manner. Two control methods are usual. In the first, the storage heater is heated from commencement of the low tariff period and switched off in dependence on the ascertained control quantity. In the second case, the control quantity determines the commencement of heating, which then lasts until the end of the low tariff period. In both cases, additional control can be effected during the heating period in dependence on the outside temperature, the heater core temperature, or the like.

In one known charging control device, an electronic charge storer, for example a condenser or a secondary element, is used as the integrator which is charged or discharged on commencement of the low tariff period. The sensing circuit comprises a switch amplifier which reacts when the integrator voltage exceeds or falls below a predetermined actuating value, whereupon heating of the storage core commences. The charging, discharging or the level of the actuating threshold may be dependent on the outside temperature. When, in this control device, a residual charge is present in the integrator from the preceding cycle, errors occur. This is all the more serious since electronic time elements in any case have larger tolerances than the previously used more expensive mechanical time elements. Since such errors are summated in the integrator, considerable inaccuracies must sometimes be put up with.

The invention is based on the object of providing an electronic charging control device of the aforementioned kind, in which time errors can occur only within a very narrow range.

This object is achieved in accordance with the invention by means of a synchronising apparatus which can be switched on at the start or finish of the low tariff period, is controllable by the sensing circuit and, if a predetermined charge condition does not obtain, transmits a synchronising current through the integrator until said charge condition has been reached.

The change between the high and low tariff periods indicated by an alteration in the tariff signal that is present in any case is therefore utilised for checking whether a predetermined output condition exists. If the check shows a departure, the synchronising apparatus comes into action in order to bring the desired output condition into existence. No larger errors can therefore occur in the charging control device than those resulting during a 24-hour day. Accumulation is impossible. This results in an accuracy hitherto unattainable with electronic integrators.

It is particularly favourable if the predetermined charge condition is the discharge condition and the synchronising current is an amplified discharge current. This has the advantage that only those errors need be compensated during synchronisation that have led to incomplete discharging. On the other hand, excessive discharging cannot result in falsification of the desired output condition.

It is particularly favourable if the integrator can be fed with a constant first current during the high tariff period and, from the start of the low tariff period and until the predetermined charge condition has been reached, with an oppositely directed second current which follows changes in the outside temperature in the opposite sense, whereupon heating commencement, or until the end of the low tariff has been reached, whereupon synchronisation commences. In this case the predetermined charge condition for commencement of heating and for commencement of synchronisation is the same. A single sensing circuit will therefore be adequate. By reason of the constant output condition, the charge condition of the integrator at commencement of the low tariff period has a constant valve. This is then decreased in dependence on the outside temperature so that a short time up to commencement of heating corresponds to low temperatures and a long time corresponds to high temperatures. If the time is too long because of very high outside temperatures, there will be no heating at all; instead, the charge condition is corrected by the synchronising apparatus.

In a preferred embodiment, the integrator is a couliode, i.e. an electrolytic element in which a solid state electrolyte of high ion conductivity, e.g. a silver halogenide compound, is disposed between an electrode of active material such as silver and an electrode of relatively inactive material such as gold. During charging, active material moves onto the inactive electrode. During discharging, the active material wanders back. This couliode, which is known per se, is not only a good integrator for present purposes but also has the advantage of having a considerably higher resistance in the discharged condition than in any other charge condition. This jump in resistance facilitates determination of the discharge condition.

Preferably the integrator has an earthed pole and an operating pole to which a charging circuit, a discharge circuit, the sensing circuit and the synchronising apparatus are connected.

In particular, the synchronising apparatus may comprise a normally blocked switching transistor of which the collector-emitter path is in series with a limiting resistance, this series circuit being disposed between the operating pole and a discharge voltage, and of which the base receives a synchronising signal effecting opening if after the end of the low tariff period the sensing circuit indicates any condition other than the discharging condition. A very simple circuit therefore suffices for the synchronising apparatus.

Preferably the sensing circuit measures the resistance of the integrator and derives, from the high resistance in the discharging condition, a sensing signal at its output. This can be effected in that the sensing circuit comprises two transistors of which the collectors are each connected through a resistance to a control voltage and the emitters are each earthed, the base of the first transistor being connected to the operating pole, the base of the second transistor to the collector of the first transistor and the output to the collector of the second transistor. Such a sensing circuit is readily able to deliver a sensing signal which is equal to the control voltage in the discharging condition but at other times corresponds to earth voltage. It is also favourable to have a switching device which connects to the operating pole a charging voltage by way of the drain-source path of the first field effect transistor and a limiting resistance and, by way of the drain-source path of a second field effect transistor, a current generator that is controlled by the outside temperature, wherein the one field effect transistor is in the blocking position and the other field effect transistor in the conducting position and they can be switched over by a switching signal that depends on the nature of the tariff. For example, a transistor may be provided which is to be opened at its base by the switching signal and which, by means of a diode circuit, controls the gates of the field effect transistors and, in the open condition, opens the first field effect transistor and blocks the second field effect transistor and, in the blocked condition, blocks the first field effect transistor and opens the second field effect transistor.

Further, the current generator may comprise an amplifier, the input of which is controlled by a voltage that changes in the opposite sense to the outside temperature. Such a current generator is preferable to an outside temperature-dependent resistance if the integrator has an inherent resistance that is dependent on the charge condition, as is the case with a couliode.

In a preferred embodiment, use is made of a logic circuit comprising a first input for a tariff signal depending on the nature of the tariff, a second input for the sensing signal, a first output for the synchronising signal, a second output for the heating signal determining commencement of heating, and possibly a third output for the switching signal. In this way all the important switching steps are programmed with the aid of two input signals.

In particular, the logic circuit may be built up so that the first input is connected by way of a first NOT-element to an impulse generator and the first input of a first NAND-element, as well as by way of a second NOT-element, which is in series with the first NOT-element, to the first input of a second NAND-element, that the second input is connected by way of a third NOT-element to the first input of a third NAND-element, that the impulse generator is connected to the first input of a fourth NAND-element, that the outputs of the third and fourth NAND-elements are connected to the second input of the respective other NAND-element, that the output of the third NAND-element is connected to the second input of the first NAND-element and, by way of a fourth NOT-element, to the second input of the second NAND-element, that the output of the first NAND-element is connected by way of a fifth NOT-element to the second output of the logic circuit, and that the output of the second NAND-element is connected to the first output of the logic circuit. Despite galvanic coupling, the third and fourth NAND-elements together form a dynamically acting flip-flop of which the output is not only governed by the existing input values but also by the previously applied input values.

The invention will now be described in more detail with reference to an example illustrated in the drawing in which:

FIG. 1 diagrammatically shows a storage heater having the charging control device according to the invention;

Figure 1:
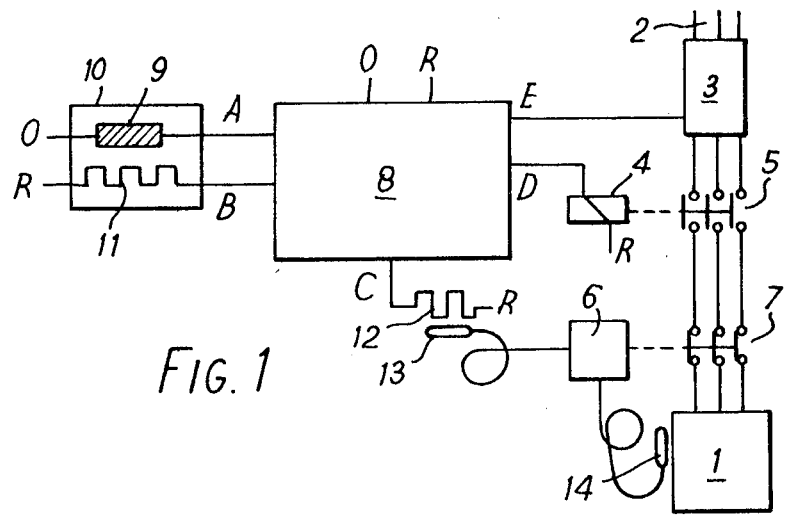

The core 1 of an electric storage heater is connected to a three-phase mains 2 by way of a night tariff meter 3, a main switch 5 controlled by a relay 4 and a thermostatic switch 7 actuated by a core thermostat 6. A charging control device 8 is on one side connected to one phase R and on the other side to the neutral conductor 0. It has five connections. A temperature-dependent resistance 9 acting as outside temperature senser is connected between the output A and the neutral conductor. In a sensing unit 10 it is combined with a heating rsistance 11 applied between the connection B and the phase conductor R. Between the connection C and the phase conductor R there is a heating resistance 12 which heats an auxiliary senser 13 of the core thermostat 6. This auxiliary senser is provided in addition to the core senser 14. The relay 4 is connected between the connection D and the phase conductor R. A tariff signal indicating the nature of the tariff is fed to the connection E from the night tariff meter 3. The control device may also be used for heating the cores 1 of a plurality of heaters.

Figure 2:
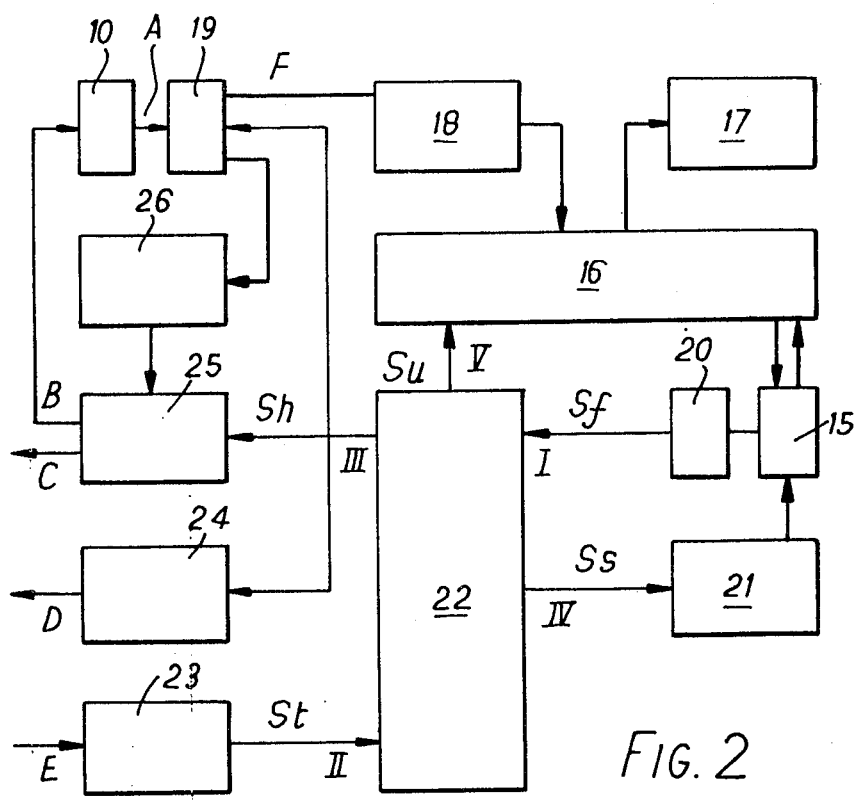
FIG. 2 is a block circuit diagram of the charging control device.

As shown in FIG. 2, the charging control device comprises the following principal groups. With the aid of a switching device 16, an electronic integrator 15 is alternately connectible to a charging apparatus 17 or a discharging apparatus 18. The latter is controlled by a signal amplifier 19 which, in turn, is energised by the outside senser 9 in the conbination 10. A sensing circuit 20 determines when the integrator is fully discharged. A synchronising apparatus 21 serves for fully discharging the integrator 15 if the latter has not already reached this condition at the end of the low tariff period. At the input I, the sensing signal $S_f$ is fed into a logic circuit 22 which, at the input II, receives a tariff signal $S_t$ from the connection E through an intermediate element 23. A heating signal $S_h$ occurs at the output III of the logic circuit 22 when heating is to take place. This firstly energises a relay switching circuit 24 leading to the connection D. Further, a thermal control circuit 25 is energised which, in dependence on an impulse circuit 26, alternately supplies the outside senser heating resistance 11 and the auxiliary senser heating resistance 12 with energy. To control the impulse circuit 26, the signal amplifier 19 is also connected to the output III. The heating signal $S_h$ there brings a higher amplification factor by means of which the response value of the impulse circuit 26 can be exceeded. This circuit ensures that the auxiliary senser heating resistance 12 is fed with energy impulses which the length is proportional to the outside temperature. Consequently the switching-off temperature of the core thermostat 6 is changed oppositely to the outside temperature because the two sensers 13 and 14 act on a common bellows element. A synchronising signal $S_s$ is delivered to the synchronising apparatus 21 by way of the output IV and a switching signal $S_u$ is applied to the switching apparatus 16 through the output V.

Figure 3:
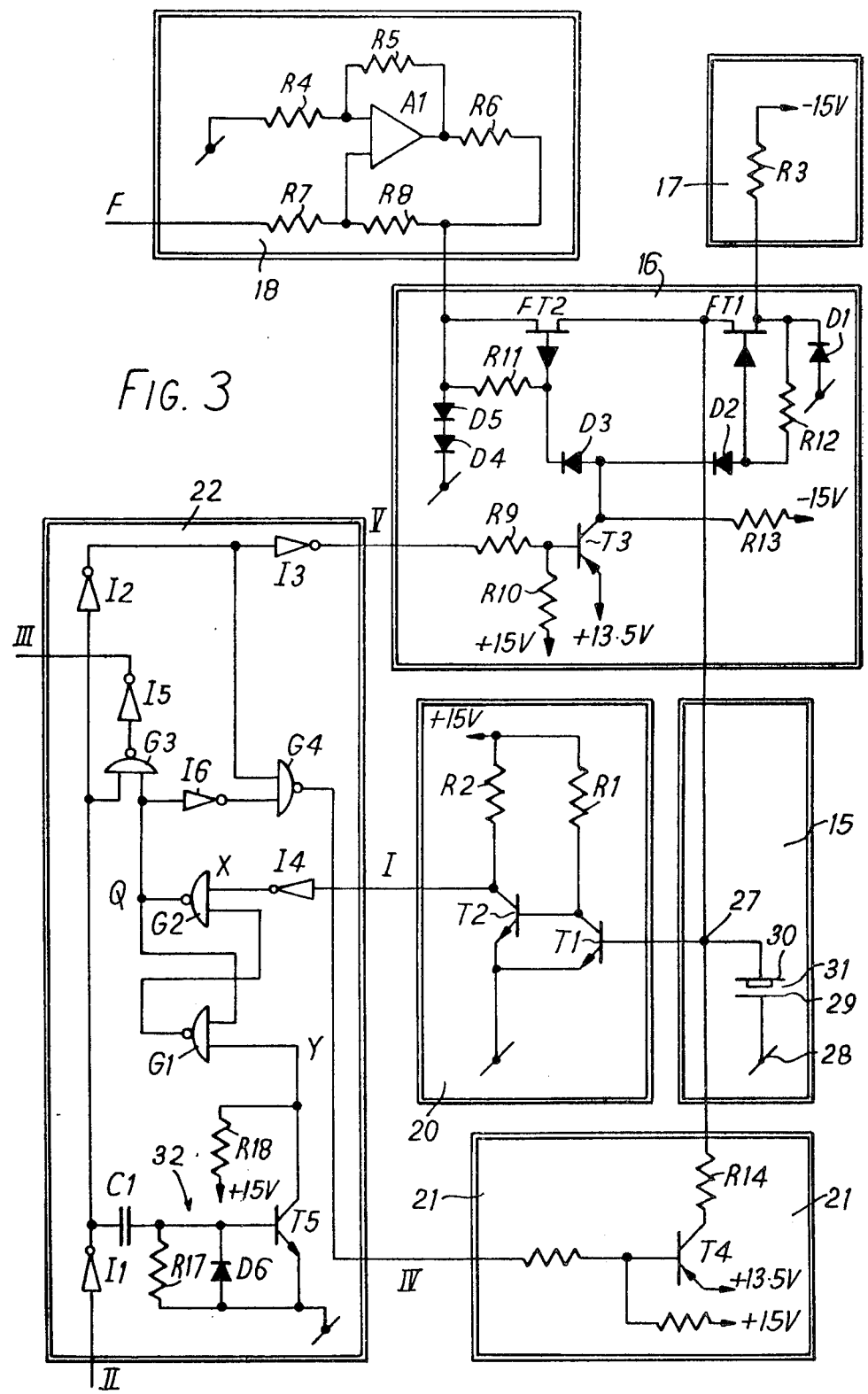
FIG. 3 is a circuit diagram of the important components of the charging control device according to the invention.

FIG. 3 shows the construction of the blocks 15, 16, 17, 18, 20, 21 and 22 of FIG. 2.

A couliode C1 is used as accumulator in the integrator 15 and comprises an operating pole 27 and an earthed pole 28. The lower electrode 29 consists of silver and the upper electrode 30 of gold. A solid state electrolyte 31 of silver halogenide compound is disposed therebetween. If current is led from the pole 28 to the operating pole 27, a proportional amount of silver is transmitted from the electrode 29 to the electrode 30. As soon as the gold electrode 30 is completely free from silver, i.e. when the couliode is discharged again, there is a sudden rise in the internal resistance of this element.

This resistance is measured with the aid of the sensing circuit 20. The sensing circuit comprises two transistors T1 and T2, the collectors of which are each connected to a control voltage of +15 V by way of a resistance R1 and R2 and the emitters of which are each connected to earth 28. The base of the first transistor T1 is connected to the operating pole 27 and the base of the second transistor T2 to the collector of the transistor T1. The collector of the transistor T2 leads to the input I of the logic circuit 22. As long as the couliode is charged and therefore has a small resistance, the passing current gives rise to a small voltage drop. This does not suffice for making the transistor T1 conductive. Consequently the transistor T2 is conductive and has the potential zero at the input I. If the resistance of the couliode C1 increases because it is completely discharged, the potential of the operating pole 27 also increases, the transistor T1 opens, the transistor T2 closes, and the input I of the logic circuit 22 is supplied with a control signal of +15 V.

Charging of the couliode C1 is effected by means of the charging circuit 17 which simply comprises an adjustable resistance R3 applied to a charging voltage of −15 V.

Discharge takes place with the aid of the current generator 18 which consists of the amplifier A1 and the resistance R4, R5, R6, R7 and R8 which are so selected that the outgoing discharge current is only dependent on the ratio between the voltage at the input F, which is delivered as the outside temperature-dependent value from the signal amplifier 19, and the resistance R6. Any changes in the resistance of the current path, e.g. in the couliode C1, are insignificant.

In the switching device 16 there are two field effect transistors FT1 and FT2 of which one is conductive and the other is blocked, or vice versa, depending on the presence or absence of a control signal at the output V of the logic circuit 22. As a result, the charging circuit 17 and the discharging current generator 18 are alternately applied to the operating pole 27. For switching over, a switching transistor T3 is used of which the base is applied to a tapping of a voltage divider consisting of the resistances R9 and R10, the voltage divider being connected to a control voltage of +15 V. Since the emitter of the switching tansistor T3 is applied to a voltage of +13.5 V, this transistor is blocked when a control signal of +15 V occurs at the output V and conductive when zero voltage occurs there. There is also provided a diode circuit consisting of the diodes D1, D2, D3, D4 and D5 in conjunction with three resistances R11, R12 and R13. As will be evident from the illustration, the gate of the field effect transistor FT1 is held at source potential when the transistor T3 is conductive so that this field effect transistor is conductive for the purpose of charging whilst the other field effect transistor FT2 is blocked. If, however, the transistor T3 is blocked, substantially source potential obtains at the gate of the field effect transistor FT2, which is therefore conductive whilst the other field effect transistor FT1 is blocked. The two diodes D2 and D3 alternately act as blocking diodes whilst the diodes D1, D4 and D5 prevent the field effect transistors from functioning as constant generators.

The synchronising apparatus comprises a transistor T4 of which the collector is connected to the operating pole 27 through a resistance R14. The emitter is applied to a voltage of +13.5 V. The base is connected to a tapping of a voltage divider consisting of the resistances R15 and R16, this voltage divider being disposed between the output IV of the logic circuit 22 and the control voltage of +15 V. This transistor is closed as long as a control signal of +15 V is present at the output IV, and open as soon as this signal drops to zero volt. The resistance R14 is so dimensioned that, when the transistor T4 is open, a comparatively strong current flows through the couliode C1 until the sensing circuit 20 ascertains that the discharge condition has been reached.

By way of example it may be stated that a charging of for example 100 – 500 μA, corresponding to an outside temperature-dependent discharge current of 200 – 1000 μA, maybe associated with a synchronising current of about 1 – 3 mA.

At the inputs and outputs of the logic circuit 22, signal voltages can occur having the values 0 V and 15 V, corresponding to logic "0" and logic "1". The realtionship of Table I applies.

TABLE I

| Signal | Function | "0" | "1" |
|---|---|---|---|
| I sensing signal $S_f$ | couliode discharged | no | yes |
| II tariff signal $S_t$ | running down time | yes | no |
| III heating signal $S_h$ | heating | no | yes |
| IV synchronising signal $S_s$ | synchronisation | yes | no |
| V switching signal $S_v$ | discharged | no | yes |

The logic circuit 22 comprises three series-connected NOT-elements I1, I2 and I3 which connect the input II to the output V. The output of the NOT-element I1 feeds an impulse generator 32 consisting of a condenser C1, a resistance R17, a diode D6, a transistor T5 and a resistance R18. If the tariff signal at the input II changes from high tariff period to low tariff period, the transistor T5 becomes momentarily conductive so that it momentarily changes from the value "1" to the value "1". The output of the impulse generator is connected to the one input of a NAND-element G1 of which the output is connected to the one input of a second NAND-element G2. The other input of the second NAND-element G2 is connected to the input I by way of a NOT-element I4. The output of the NAND-element G2 is connected to the other input of the NAND-element G1. The two NAND-elements G1 and G2 form a memory circuit having the following factual system if the output is designated Q, the input fed by the NOT-element I4 is designated X, and the input coming from the impulse generator 32 is designated Y:

TABLE II

| A | B | Q |
|---|---|---|
| 1 | 1 | undefined |
| 1 | 0 | 0 |
| 1 | 1 | 0 |
| 0 | 1 | 1 |
| 1 | 1 | 1 |
| 1 | 0 | 0 |
| 0 | 0 | 1 |

The output III is connected through a NOT-element I5 to a NAND-element G3 of which the inputs are energised on the one side by the output of the NOT-element I1 end on the other side by the output Q. The output IV is connected to a NAND-element G4 of which the inputs are supplied on the one side by the output of the NOT-element 12 and on the other side by the output Q through a further NOT-element 16. The operating conditions of Table III can be derived therefrom.

TABLE III

|    | I | II | III | IV | V           |
|----|---|----|-----|----|-------------|
| 1. | 0 | 1  | 0   | 1  | 0           |
| 2. | 0 | 0  | 0   | 1  | 1           |
| 3. | 1 | 0  | 1   | 1  | 1           |
| 4. | 0 | 1  | 0   | 0  | 0           |
| 5. | 0 | 1  | 0   | 1  | 0 (= as 1.) |

The operating condition 1 occurs during the high tariff period during charging of the couliode C1.

During the operating condition 2, which was brought about by switching to the low tariff period, discharge takes place in dependence on the outside temperature, discharging being all the more rapid as this temperature is lower.

The operating condition 3 is introduced when the sensing circuit 20 has determined complete discharge of the couliode C1. At this instant heating of the storage core commences. This heating continues up to the end of the low tariff period but in such a way that the core temperature is itself dependent on the outside temperature.

The operating condition 4 replaces the operating condition 3 if the couliode C1 has not become completely discharged at the end of the low tariff period, i.e. if no heating of the storage core was necessary because of excessively high outside temperatures. In this case the synchronising apparatus 21 is switched on at the end of the low tariff period until the sensing circuit 20 has indicated complete discharge.

The operating condition 5, which corresponds to the operating condition 1, is adopted either when the low tariff period is finished after a heating period or if the sensing circuit 20 has determined the complete discharge condition after the end of the low tariff period.

Altogether, therefore, the operation is such that the first part of the low tariff period is utilised for determining the heating requirement and the last part of the low tariff period for heating. Since there is a check after every 24 hours as to whether the integrator is completely discharged and, if this is not the case, a corresponding synchronisation is effected, one ensures that none of the errors are cumulative.

I claim:

1. An electronic charging control device for electric storage heaters comprising an electronic integrator, means for charging said integrator to a predetermined value during a first period, means for discharging said integrator during a second period, outdoor temperature sensing means moderating the operation of said discharging means at a rate inversely proportional to sensed outdoor temperatures, time controlled switching means for respectively connecting said charging and discharging means to said integrator during said periods, charge sensing means operative during said second period for sensing the absence of a charge on said integrator, heat control means responsive to said charge sensing means for generating a signal to actuate a heater power supply in response to the presence of a charge on said integrator and time controlled synchronizing means responsive to said charge sensing means for rapidly discharging any remaining charge on said integrator at the end of said second period.

2. A device according to claim 1 wherein said integrator has electrodes of relative active and inactive elements disposed in a solid state electrolyte of high ion conductivity.

3. A device according to claim 2 wherein said elements are silver and gold and said electrolyte is a silver halogenide compound.

4. A device according to claim 1 wherein said integrator has one terminal to which is connected said charging and discharging means, said charge sensing means and said synchronizing means.

5. A device according to claim 1 wherein said charge sensing means senses the absence of a charge on said integrator by sensing a high resistance.

* * * * *